United States Patent

Natali

[19]

[11] Patent Number: 6,065,668

[45] Date of Patent: May 23, 2000

[54] PROCESS FOR THE CONSTRUCTION OF PRE-PROTECTED STEEL SHEET STRUCTURES, MADE STABLE BY WELDING

[76] Inventor: Gianfranco Natali, 1, Via Roma, I-06019 Umbertide (PG), Italy

[21] Appl. No.: 09/055,932

[22] Filed: Apr. 7, 1998

[30] Foreign Application Priority Data

Apr. 18, 1997 [IT] Italy .................................. AR97A0014

[51] Int. Cl.⁷ .............................. B13K 31/02; B13K 1/20; B13K 26/00
[52] U.S. Cl. .......................... 228/204; 228/208; 228/214; 219/121.63; 219/121.64
[58] Field of Search ................................ 228/234.1, 203, 228/208, 214; 219/121.63, 121.64

[56] References Cited

U.S. PATENT DOCUMENTS

| | | | |
|---|---|---|---|
| 3,881,084 | 4/1975 | Baardsen .......................... | 219/121 LM |
| 4,663,240 | 5/1987 | Hajdu et al. ............................ | 428/545 |
| 4,840,304 | 6/1989 | Sato et al. ................................ | 228/214 |
| 4,853,285 | 8/1989 | Sobata et al. ........................... | 428/336 |
| 4,873,415 | 10/1989 | Johnson et al. ...................... | 219/121.64 |
| 5,023,146 | 6/1991 | Saito et al. ............................... | 428/623 |
| 5,183,991 | 2/1993 | Arai ................................... | 219/121.64 |
| 5,216,220 | 6/1993 | Davis et al. ......................... | 219/121.63 |
| 5,717,160 | 2/1998 | Bootle .................................... | 174/35 R |
| 5,741,559 | 4/1998 | Dulaney ................................... | 427/554 |

*Primary Examiner*—Patrick Ryan
*Assistant Examiner*—Kiley Stoner
*Attorney, Agent, or Firm*—Young & Thompson

[57] ABSTRACT

The object of the invention consists of a process through which containing metal structures are built and shaped, in one case using steel sheets pre-protected by paints, and made to be electrically conductive by adding aluminium powder, or other equivalent conductive metals having a fusion temperature which is equivalent to the one fusing the sheets to be welded, and whose boiling temperature is higher than their fusion one; in a second case using sheets pre-protected by a thin layer of zinc plating followed by an external film of acrylic resin; it also consists in resorting to the aid of anthropomorphic welding robots, at the end of whose mobile arm is placed the laser beam out put unit connected to the laser source by an optical fibre cable, and also in the fact that the welding is carried out on the internal not visible sides of the containing structures that are being built.

3 Claims, 1 Drawing Sheet

PROCESS FOR THE CONSTRUCTION OF PRE-PROTECTED STEEL SHEET STRUCTURES, MADE STABLE BY WELDING

BACKGROUND OF THE INVENTION

1. Field of the Invention

The invention relates to a process through which it is possible to join, with the aid of laser welding, metal sheets that are pre-protected against the corrosive action of external agents; the invention is especially directed towards the field of frame and box-like structure building, used to contain electric and electronic circuits, and the aim of the present invention is to obtain effective shielding of electromagnetic fields to avoid both the spreading of external electromagnetic waves towards the inside of these frames and box-like structures, and the outward spreading from these structures and frames of electromagnetic fields produced inside them.

2. Description of the Related Art

In the fields of electro-technics, electromechanics and electronics, metal sheet containing structures, with welded together and permanently joined parts, are widely used. These metal sheets are usually made of steel and they are normally pre-protected against corrosion caused by external agents by a layer of zinc which allows the electrical contact between the sheets and the equipotentiality of distinct parts forming the final assembled containing structure. All the above creates a Faraday cage, which protects from electromagnetic fields the contents of the box-like structures obtained form cut, bent and joined sheets. Said layer of zinc must be several thousandths of millimetres thick in order to be quite resistant to external agents and to avoid that the friction caused by the bending, shaping machines should remove it, therefore uncovering the steel that should be protected in certain areas.

The electrical welding of the joined parts is carried out by passing an intense current through the metal, which heats it locally, until it reaches the temperature in which the layers of zinc fuse and on the spot where they have fused, the sheets that are pressed one on top of the other are joined. On the spots where the electrodes push the sheets one on top of the other to be welded, the surfaces become rough because the layer of zinc is burnt (it fuses at approx. 420° C.) and this visible scar reduces the quality of the finished product.

Another disadvantage of electric welding in mass production is the fact that the points to be welded are not always easily to reachable by the electrodes. This is why, it is necessary to have welding machines having specifically built welding heads which involves considerable expense. Furthermore, if there are various welding points on the same steel structure, it may be necessary to provide welding machines equipped with welding heads having different shapes. Therefore, the same metal structure being built must undergo different welding passages at different stations and must pass through the action of different welding machines. These welding machines may require changing their welding heads according to the type of welding they must carry out, this is often difficult and costly.

When the aesthetic aspect is important to establish the value of the welded box, it is necessary to use non protected steel sheets, then to weld them together and finally to protect the surfaces uniformly with zinc, thus involving extra costs. In some cases it is even impossible to protect the surfaces uniformly against the corrosion of external agents, because the protecting component, paint or zinc, cannot reach the parts between the joined and welded surfaces in some points.

The inconveniences and disadvantages of the rough surfaces where they have been welded and of the welding machines with specifically designed welding heads, a consequence of the use of the electric spot welding method, may be overcome by welding with laser welding machines.

The latter ones can operate at a distance of 100 to 200 mm from the surface where the heating effect, through which the welding occurs, must take place, therefore, these machines can operate without mechanically touching the parts that need welding and without the need of an electric contact, they can carry out welding points and lines on structures that are very different or they can carry out the welding on different parts of the same structure, without needing to modify their welding head. This makes the laser welding process much faster, cheaper and more flexible, in fact the required changes to adapt the welding laser machine to different welding conditions consist in modifications of the software program that commands the movements of the robot and of its welding head and does not require mechanical modifications.

Another advantage in the use of laser welding machines consists in the fact that the welding could be carried out by hitting the internal surface (not visible) of the structure being built with the laser beam, therefore provoking a trace that will not damage the aesthetic aspect of the finished steel structure.

However, the laser welding cannot be presently used to join sheets that have been pre-protected by a thick layer of zinc, without inconveniences. In fact, in order for the welding to be accurate, the laser beam overheats the metal until it fuses at the point where the surface is hit by the said beam. Then the heat penetrates in depth until reaching the other sheet which is pressed close to the one hit by the laser beam.

In that case the reached temperatures are the ones that fuse sheets and they are however over 1000° C. to allow a rapid spreading of the heat from the sheet hit by the beam to the one next to it, and/or on the points of contact, or pressed together to obtain a migration of particles from one sheet to the next obtaining a permanent joining of the parts. However, zinc burns at these temperatures and also develops violent reactions with explosions that cause perforations on the sheet hit by the laser beam and brought to a fusion temperature.

Therefore, splashes of fused metal and the formation of an irregular and rough surface on and around the perforation occur where the welding has been carried out. The roughness and unevenness of the surface hit by the laser beam make the frame unacceptable for both the aesthetic aspect and the inconsistency of the welding. This is an impediment to the use of the laser welding process, unless one uses steel sheets unprotected by zinc, which can be coated with a thick layer of zinc after the welding process, with the inconveniences described above.

In this case (using non coated sheets), the protection on the joined surfaces where the welding has been carried out, is uneven because the zinc cannot penetrate well between the overlapped sheets, therefore, the sheets will oxidise and in time ruin and damage where the parts of the structure are not well protected.

Due to all the above described facts, manufacturers that build frames and steel sheet box-like structures use electric welding, with the above described disadvantages. Another disadvantage when using sheets pre-protected by zinc is its porosity that causes the formation of prints and stains on the surfaces when touched by oily or greasy hands or machines.

Another disadvantage of the prior art techniques is that sheet frames are missing shields for electromagnetic fields corresponding to openings closed by elements that are made from non conductive material, such as connecting gaskets, plastic caps and other components that interrupt the metal continuity of the same containing frames.

SUMMARY OF THE INVENTION

The object of the present invention is to find a process that will make it possible to join metal sheets whose surfaces have been first pre-protected against external agents through laser welding, so that the metal structures are ready to be used, after the welding stages have been carried out, without needing further protecting processes against corrosion caused by external agents.

Another aim of the present invention is that it is possible to use a single laser machine that can carry out all welding even in very different parts, including those that are not easily reachable by mechanic equipment, to allow carrying out all necessary welding on a single station and with a single non specifically created machine. Another advantageous aim is that the laser beam can reach parts that are internal to the box-like structure and not visible from the outside, therefore the external surfaces remain perfectly smooth and finished and of good quality, the welding points being carried out without defects or perforation of the welded sheets, thus obtaining a box-like metal structure that can perfectly shield electromagnetic waves.

The last aim of the present invention is to obtain an almost even shielding of electromagnetic waves on the entire frame, including the parts where the non conductive inserts are placed.

The process, object of the present invention, which allows to obtain the above described results, first of all consists of a process in which containing metal structures are shaped and built using pre-protected steel sheets, in one case they are pre-protected by pre-painting with paints made to be electrically conductive by adding aluminium powder, or other equivalent conductive metals and having a fusion temperature like the one that fuses the sheets to be welded, and whose boiling temperature is higher than their fusion one; in a second case the steel sheets are pre-protected by a thin layer of zinc plating followed by an external film of acrylic resin. Regarding their welding, the process consists in resorting to the use of anthropomorphic welding robots, whose laser beam out put head connected to the laser source by an optical fibre cable, is placed at the end of its mobile arm, thus allowing any movement, also in those cases in which the welding is carried out on the internal and not visible parts of the containing structures that are being built, and finally in the use of conductive paints or of a very thin conductive film coated by paint or acrylic resin which covers the protruding parts of the non conductive material inserts applied on openings existing on the containing structures.

The above described process is a creative and unique solution to a real technical problem and is a concrete improvement to prior art techniques.

It makes it advantageous to build pre-protected steel sheet structures however shaped, with parts that are joined together with lines or points of welding made from and on the inside of the structures, avoiding non-aesthetic traces on the outer visible surfaces.

The use of protecting treatments against external elements with conductive paints, that fuse at working temperatures without explosive effects, allows safe welding without damages on the welded parts.

Whereas, applying a very thin layer of zinc (1–3 micron) blocks the explosive effect of zinc when it is brought to the welding temperature of the sheets, and at the same time, its porosity allows the application of acrylic resin which, also in the case of reduced layers of zinc to few thousandths of a millimeter, allows obtaining an appropriate resistance to external agents and helps avoiding the zinc protection to be removed from the sheets during the bending and pressing process, therefore avoiding uncovered and unprotected sheets. Furthermore, the application of the above mentioned resin eliminates the porosity of the zinc, avoiding the absorption of oils and greases therefore the formation of stains and unpleasant print marks.

At the same time, the few micron thickness of the acrylic resin on the layer of zinc allows the passage of electric current between the parts that are brought together (joined) (without requiring further elements for the electric connection), as in the case of compound containing structures, for example, formed by a box-like structure and its cover.

The use of anthropomorphic welding robots, having a mobile limb which carries the head of the laser beam out put, and is also mobile by using adductive optical fibre, allows operating from a distance and also following slanted/oblique directions compared with the surface on which it should operate, allowing welding different points that are also difficult to reach without resorting to other specific welding machines.

Finally, the use of conductive paints or of a very thin layer of zinc combined with an acrylic resin film, to coat the steel sheets, makes the laser welding possible. Furthermore, the use of conductive paints to cover any plastic insert, or inserts that are not electric conductors, applied on the opening of the box-like structure makes it a structure which is almost uniformly coated by an electrically conductive film. This film insulates the inside of the box-like structure from electromagnetic waves. It is therefore limited by an almost uniform conductive surface which creates a Faraday cage protecting the circuits that are placed inside the sheet structure from external electromagnetic waves, and/or to protect what is outside the structure from electromagnetic waves produced inside it.

BRIEF DESCRIPTION OF THE DRAWINGS

The invention is here-below described in detail with reference to the drawings of the enclosed table, produced only as an example and by no means constituting any limitation, in which.

Figure 1:
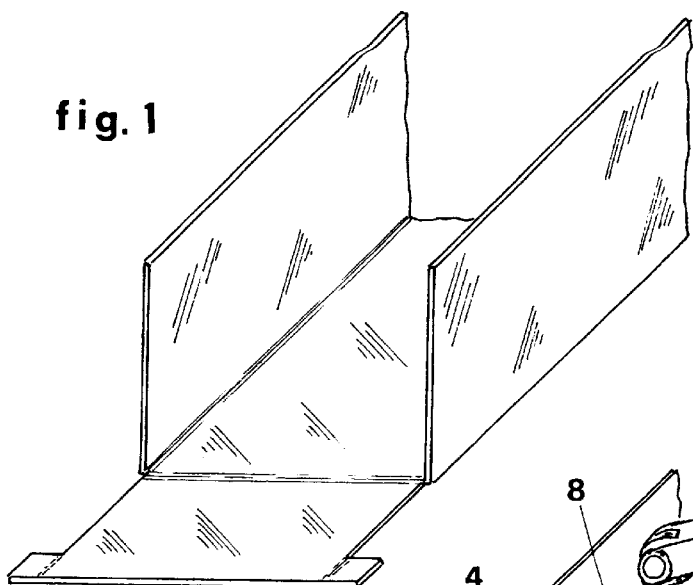
FIG. 1 exemplifies a sheet structure whose face must be bent and joined to the sides of the same box-like structure.
Figure 2:
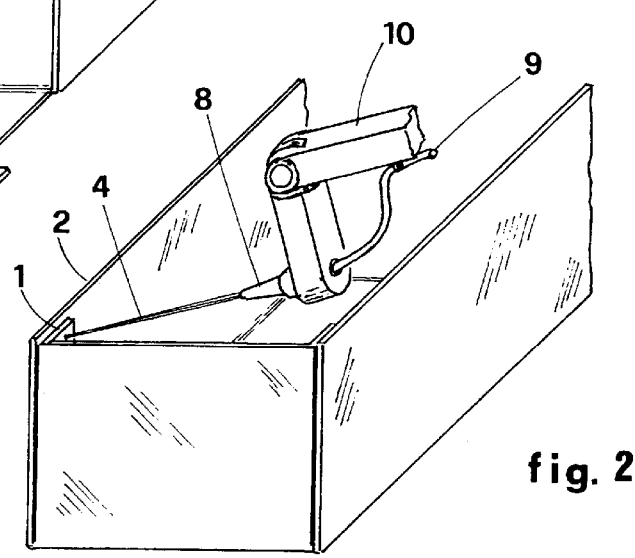
FIG. 2 exemplifies the structure in FIG. 1 when it is completely bent, while a welding unit carries out the laser welding from the inside.
Figure 3:
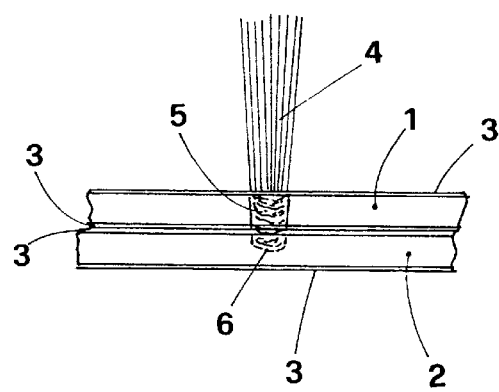
FIG. 3 exemplifies the welding process on two pre-protected overlapped sheets, carried out by a laser beam and shows how the welding only heats a portion of the external sheet, without externally damaging its visible surface.
Figure 4:
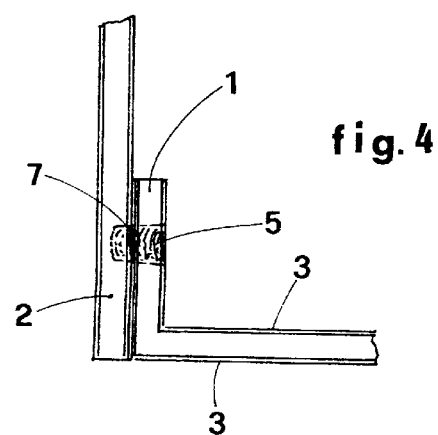
FIG. 4 is an enlarged scale showing a point of welding made with the laser beam in which a side and a face of the structure in FIG. 1 are joined together.

It is understood that the drawings and the corresponding described parts have a demonstrative character and are presented exclusively to illustrate the object of the present invention, without in any way constituting a limitation.

DESCRIPTION OF THE PREFERRED EMBODIMENT

In the drawings, 1 indicates the internal steel sheet, 2 indicates the external steel sheet, 3 indicates the films made with electrically conductive paints or with a combination of a very thin layer of zinc, 1–3 thousandths of a millimeter, and a film of external acrylic resin with which sheets 1 and 2 are coated. 4 indicates the laser beam, 5 indicates the metal of the internal sheet 1 which is heated by the laser beam until it fuses, 6 indicates the portion of the metal of the external sheet 2 which is heated until fused, 7 indicates the welding points 8 indicates the head from which the laser beam 4 is delivered, 9 indicates the optical fibre cable that feeds the head 8 delivering the laser beam 4 produced by the laser source, 10 indicates the mobile arm of the welding robot.

In essence the invention concerns a process to build box-like structures from metal sheets coated by a film 3 that protects them against the corrosive action of external agents. These structure are made stable by joining them by laser welding on points 7 of the overlapped surfaces 1 and 2, in a way that confers stability and mechanical resistance to the box-like structures. Sheets 1 and 2 are usually made of steel, or of a low cost electrically conductive metal. Their surfaces are protected against the corrosive action of external agents by protective films 3 which are made in a unique way, with paints for example polyurethane type paints which have been made electrically conductive by adding powders of aluminium or other conductive metals Before the fusion and welding process begins, the above described paint volatilizes, without preventing an accurate fusion of sheets 1 and 2 and of the metal powders previously mixed with the same paint, so that the welding will result from an accurate mixing of the fused metal parts. In order for the welding to be accurate the powdered metal contained in the protection paint is chosen having a very high boiling temperature, in any case higher than the temperature reached by the metal or metals (not necessarily the same), from which sheets 1 and 2 are produced when heated by the incident laser beam 4. In another case the protection on the metal sheet making the structure is first obtained with a very thin layer of zinc of 1–3 micron, so that its fusion and boiling will not provoke any explosion, therefore with a very thin film of acrylic resin which protects the very thin layer of zinc.

Under these conditions, through the above process, a violent increase in volume of the metal powder contained in the paint or of the very thin layer of zinc in the film 3 which passes from a solid to a fused state during the welding process is prevented. This in order to avoid blasts and/or boiling with devastating effects on the metal of the internal sheet 1 fused by the laser beam 4 in all its depth. The laser beam 4, output by the delivering head 8 at the end of the robot's mobile arm 10 preferably anthropomorphic to allow reaching all the points to be welded and placed within the structure with laser beam 4 acts from the inside of the box-like structure so that the visible external surface, corresponding to welding point 7, remains perfectly smooth, or not altered aesthetically following the above welding. The welding process of the overlapped sheets is carried out by laser beam 4, the intensity of which is adjusted in order to fuse, at the point of incision, the entire depth of the internal sheet 1, and only a portion of the depth of the external sheet 2 on the side adhering to sheet 1, in order to avoid the external visible surface to undergo visible alterations. The overlapped surfaces to be welded 1 and 2 can be obtained by shearing and bending the same pre-protected metal, or the overlapped parts to be joined can be distinct and obtained from the same metal sheet or from different metal sheets.

The paint with which the protecting and shielding veils are produced, is made conductive by mixing aluminium powder to it with a volume percentage which normally varies from 2 to 10% according to the electrical conductivity one wishes to obtain.

The acrylic resin can also be made conductive by adding metal powders to it, and according to the thickness of the film made to protect the layer of zinc on which it is spread.

The box-like structure being built may have slots or openings on which gasket connectors or elements made of plastic or of other non conductive material are applied. Under these circumstances the process foresees the partial painting of the non conductive inserts covering the protruding part or parts with a layer of conductive paint or of the resin made conductive so that the said inserts are made electrically conductive on the surface in order to create the necessary shielding for the electromagnetic waves. With this phase the external and/or internal surfaces corresponding to the inserts are made to be, when necessary, electrically conductive, so that a uniform shielding of the box-like structure towards electromagnetic waves is reached without producing alterations to the aesthetic aspect of the latter which at the same time becomes appropriate for the applications that require an electromagnetic insulation of the circuitry and the components that are housed in it.

I claim:

1. A process for the construction of a pre-protected sheet metal box-like structure, comprising coating steel sheets with a layer of zinc 1–3 microns thick, directly on the steel of the sheets, and coating the zinc with a layer of acrylic resin several microns thick, placing the coated sheets in overlapping relationship to form a box-like structure, and laser-welding together the sheets in regions in which they overlap, with the laser beam applied from within the box-like structure.

2. A process as claimed in claim 1, wherein said film of acrylic resin has been made conductive by the addition of metal powders.

3. A process for the construction of a pre-protected sheet metal box-like structure, comprising coating steel sheets with a layer of polyurethane resin containing 2–10% by volume of aluminum powder, placing the coated sheets in overlapping relationship to form a box-like structure, and laser-welding together the sheets in regions in which they overlap, with the laser beam applied from within the box-like structure.

* * * * *